(12) United States Patent
Polehn et al.

(10) Patent No.: US 10,868,613 B2
(45) Date of Patent: Dec. 15, 2020

(54) SYSTEMS AND METHODS FOR PASSIVE OPTICAL SWITCHING USING MEMS MIRROR SWITCHES

(71) Applicant: Verizon Patent and Licensing Inc., Arlington, VA (US)

(72) Inventors: Donna L. Polehn, Mercer Island, WA (US); Mark T. Watts, Newport, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/148,706

(22) Filed: Oct. 1, 2018

(65) Prior Publication Data

US 2020/0106519 A1 Apr. 2, 2020

(51) Int. Cl.
| | |
|---|---|
| *H04B 17/00* | (2015.01) |
| *H04B 10/032* | (2013.01) |
| *H04B 10/25* | (2013.01) |
| *H04B 10/079* | (2013.01) |
| *H04Q 11/00* | (2006.01) |

(52) U.S. Cl.
CPC ......... *H04B 10/032* (2013.01); *H04B 10/079* (2013.01); *H04B 10/0795* (2013.01); *H04B 10/07953* (2013.01); *H04B 10/25* (2013.01); *H04B 17/00* (2013.01); *H04Q 11/0005* (2013.01); *H04Q 2011/0043* (2013.01)

(58) Field of Classification Search
CPC ....... H04Q 2011/0081; H04Q 11/0067; H04Q 2011/0083; H04J 10/032
See application file for complete search history.

(56) References Cited

U.S. PATENT DOCUMENTS

| | | | | |
|---|---|---|---|---|
| 6,243,163 | B1 * | 6/2001 | Wakabayashi | G01J 3/28 356/318 |
| 10,116,491 | B1 * | 10/2018 | Wang | H04L 41/24 |
| 2003/0189897 | A1 * | 10/2003 | Einstein | H04J 14/0297 370/220 |
| 2003/0235363 | A1 * | 12/2003 | Pfeiffer | H04Q 11/0062 385/16 |
| 2006/0104638 | A1 * | 5/2006 | Chung | H04J 14/025 398/71 |
| 2007/0280696 | A1 * | 12/2007 | Beaver | H04Q 11/0067 398/140 |

(Continued)

*Primary Examiner* — Tanya T Motsinger (57) ABSTRACT

A passive fiber optic switching ("PFOS") device may provide failover in a fiber optic network by switching a working path between different fibers of a redundant set of fibers. The PFOS device may operate passively (e.g., without an active, external, and/or continuous power supply) by harvesting the power that it needs from the light that passes over any one or more fibers that are connected to the PFOS device. The PFOS device may detect issues that disrupt signaling and/or light transmission on the working path based on quality (e.g., signaling and/or light properties) of the working path, and/or diagnostic messaging received from other devices on the working path. The PFOS device may include an optical switch, such as a Micro-Electro-Mechanical System ("MEMS") mirror switch, that can change the working path by switching light to any fiber of the redundant set of fibers.

20 Claims, 8 Drawing Sheets

(56) References Cited

U.S. PATENT DOCUMENTS

| | | | |
|---|---|---|---|
| 2010/0074577 A1* | 3/2010 | Yang | G02B 6/3546 |
| | | | 385/17 |
| 2013/0016305 A1* | 1/2013 | Kaneda | F21V 13/00 |
| | | | 349/61 |
| 2016/0187195 A1* | 6/2016 | Jung | G01J 1/0474 |
| | | | 250/206 |
| 2016/0337732 A1* | 11/2016 | Al-Walaie | H04B 10/032 |
| 2017/0063450 A1* | 3/2017 | Paulussen | H04B 10/85 |
| 2018/0351641 A1* | 12/2018 | Hoffmann | H04B 10/032 |

* cited by examiner

SYSTEMS AND METHODS FOR PASSIVE OPTICAL SWITCHING USING MEMS MIRROR SWITCHES

BACKGROUND

Fiber optic networks may provide high speed network connectivity. Pulses of light may be used to transfer information across different paths of connected optical fiber. A physical fault along a path, loss of power, and/or other failures may disrupt the transfer of light, thereby disrupting the transmission of information over the corresponding path.

DETAILED DESCRIPTION OF PREFERRED EMBODIMENTS

The following detailed description refers to the accompanying drawings. The same reference numbers in different drawings may identify the same or similar elements.

Systems and/or methods, as described herein, may provide a passive fiber optic switching ("PFOS") device. The PFOS device may be connected to a redundant set of fibers that directly or indirectly connect to the same destination in a fiber optic network. The PFOS device may provide failover by switching a working path between first and second fibers of the redundant set of fibers in response to the PFOS device detecting an issue affecting signaling and/or the transfer of light on the first fiber. The PFOS device may include an optical switch, such as a Micro-Electro-Mechanical System ("MEMS") mirror switch, that can change the working path by switching light to any fiber of the redundant set of fibers.

The PFOS may operate passively (e.g., without an active, external, and/or continuous power supply) by harvesting the power that it needs from the light that passes over any one or more fibers that are connected to the PFOS device (e.g., the redundant set of fibers and/or other connected optical fiber). In some embodiments, the PFOS devices obtains power by splitting some percentage of light passing through connected fiber to an optical sensor (e.g., photovoltaic or photodiode) of the PFOS device, converting the split-off light to power (e.g., electrical current) at the optical sensor, storing the power in a power storage device (e.g., capacitor or battery), and/or using the power to operate a microcontroller and/or the MEMS mirror switch when an issue is detected.

Figure 1:
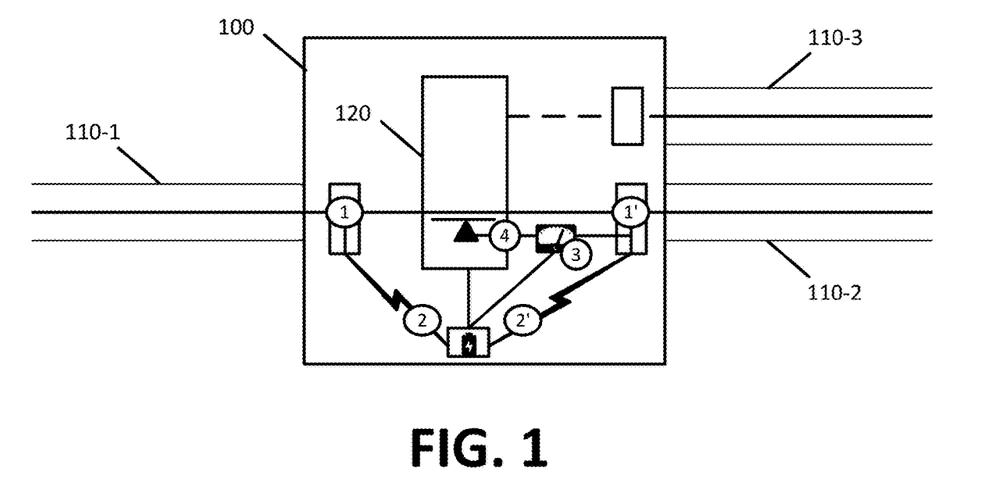
FIGS. 1 and 2 illustrate examples of passive fiber optic switching ("PFOS") device operation in accordance with some embodiments described herein.
Figure 2:
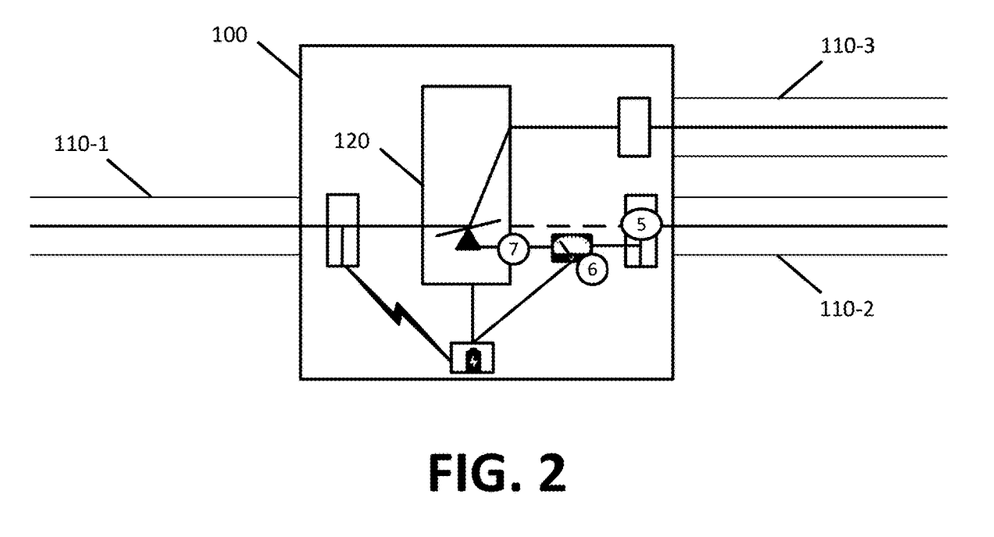

FIGS. 1 and 2 illustrate examples of PFOS device 100 operation in accordance with some embodiments described herein. In FIGS. 1 and 2, PFOS device 100 may be connected to first fiber 110-1 for upstream and/or downstream communications with a first device (e.g., a baseband unit ("BBU"), an optical network terminal ("OLT"), and/or another fiber optic device), and connected to second fiber 110-2 and third fiber 110-3 for upstream and/or downstream communications with a second device (e.g., a remote radio head ("RRH"), a fiber distribution terminal ("FDT"), and/or another fiber optic device). Second fiber 110-2 and third fiber 110-3 may provide redundant paths to the second device so that communications may continue in the event one of second fiber 110-2 or third fiber 110-3 experiences an issue that disrupts signal flow through that fiber. PFOS device 100 may include MEMS mirror switch 120 for changing the optical signaling path through PFOS device 100 between second fiber 110-2 and third fiber 110-3.

First fiber 110-1, second fiber 110-2, and third fiber 110-3 may sometimes collectively be referred to as "fibers 110" or individually as "fiber 110". In some embodiments, PFOS device 100 may be integrated as part of the first device or may be directly coupled to a transceiver of the first device instead of coupling to the first device via first fiber 110-1. In some embodiments, PFOS device 100 may be connected to one or more other fibers (e.g., a fourth fiber) that provide additional redundant paths to the second device.

FIG. 1 illustrates MEMS mirror switch 120 in a first position. When MEMS mirror switch 120 is in the first position, PFOS device 100 may establish a first path via second fiber 110-2. PFOS may divert (at 1 and/or 1') some percentage or amount of the light from the first path, and may convert (at 2 and/or 2') the diverted light to an electrical current. PFOS device 100 may use the power from the diverted light to monitor (at 3) one or more qualities of the light transferring over the first fiber path, Digital Diagnostics Monitoring ("DDM") messages, and/or other messages associated with the first path. For instance, PFOS device 100 may measure light levels (e.g., illuminance), voltage, frequency, and/or other properties of the light. PFOS device 100 may determine (at 4) that the first fiber path is operating properly, and may retain (at 4) MEMS mirror switch 120 in the first position based on the monitored light quality falling within one or more acceptable thresholds. Accordingly, in FIG. 1, PFOS device 100 may transfer signaling from the first device or first fiber 110-1 to second fiber 110-2, and/or may transfer signaling from second fiber 110-2 to the first device or first fiber 110-1. Third fiber 110-3 may be dark or inactive.

FIG. 2 illustrates PFOS device 100 changing signaling from the first path to a second path in response to an issue that is detected on second fiber 110-2 in accordance with some embodiments described herein. The issue may disrupt the transfer of light on second fiber 110-2. For instance, second fiber 110-2 may be cut, broken, and/or otherwise damaged.

PFOS device 100 may detect the issue by diverting (at 5) some percentage or amount of light from second fiber 110-2, and by determining (at 6) that the quality of the diverted light is outside the one or more acceptable thresholds. For instance, the light that is diverted from the downstream signaling on fiber 110-2 may produce a voltage of at least 5 volts ("V") when there is no issue that disrupts the downstream signaling on second fiber 110-2, and may produce a voltage of less than 5V (e.g., 0V, or some value in between 0V and 5V) when there is an issue that disrupts the downstream signaling on second fiber 110-2.

PFOS device 100 may switch (at 7) the position of MEMS mirror switch 120 from the first position, as shown in FIG. 1, to a second position, as shown in FIG. 2, in response to the issue detected on second fiber 110-2. Switching MEMS mirror switch 120 from the first position to the second position may change the communication path between the first device and the second device from the first path, that traverses second fiber 110-2, to the second path, that traverses third fiber 110-3 instead of second fiber 110-2.

PFOS device 100 may use converted power that is stored to a local capacitor or battery to power the determining (at 6), switching (at 7), and/or other operations of PFOS device 100 even when the issue impacting second fiber 110-2 temporarily prevents PFOS device 100 from harvesting additional power. In some embodiments, PFOS device 100 may produce power by converting the pulses of light, coming from upstream signaling of the first device on first fiber 110-1, to electricity.

Accordingly, PFOS device 100 can operate passively without an active, external, and/or continuous power supply. The ability of PFOS device 100 to generate power from the light and/or signaling on the fiber, allows PFOS device 100 to be placed at any point along redundant fibers of a fiber optic network where monitoring, failover, and/or other PFOS device 100 functionalities are desired. As such, PFOS device 100 can operate remote from another powered device on the fiber optic network, and/or indefinitely where there is no source of power. PFOS device 100 may therefore improve uptime and resiliency of the fiber optic network, and may prevent outages when an issue occurs on a first fiber but not a redundant second fiber. Moreover, the automatic failover to the redundant second fiber may provide maintenance crews necessary time to identify and correct the issues affecting the first fiber.

Figure 3A:
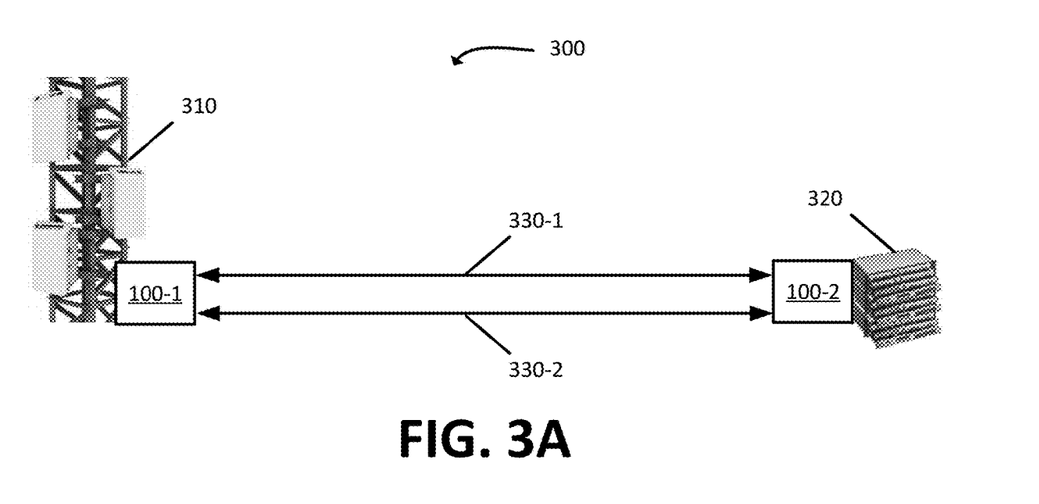
FIG. 3A illustrates an example environment, in which one or more embodiments, described herein, may be implemented.

FIG. 3A illustrates example environment 300, in which one or more embodiments, described herein, may be implemented. Environment 300 may include RRH 310 (also referred to as remote radio unit ("RRU")), BBU 320, PFOS devices 100-1 and 100-2, redundant fiber paths 330-1 and 330-2 (herein sometimes collectively referred to as "PFOS devices 100" or individually as "PFOS device 100").

The quantity of devices and/or paths, illustrated in FIG. 3A, is provided for explanatory purposes only. In practice, environment 300 may include additional devices and/or paths; fewer devices and/or paths; different devices and/or paths; or differently arranged devices and/or paths than illustrated in FIG. 3A. For example, environment 300 may include additional redundant paths between devices 100-1 and 100-2, and/or other devices located between devices 100-1 and 100-2 and connected to paths 330-1 and 330-2. Alternatively, or additionally, one or more of the devices of environment 300 may perform one or more functions described as being performed by another one or more of the devices. For instance, PFOS device 100-1 may be integrated as part of RRH 310, and/or PFOS device 100-2 may be integrated as part of BBU 320.

As shown in FIG. 3A, environment 300 may represent a fiber optic network within a radio access network ("RAN") of a telecommunications system. For instance, the RAN may be a cloud-RAN ("CRAN"), sometimes referred to as a centralized-RAN, or a RAN of a third generation ("3G") network, a fourth generation ("4G") network, a long-term evolution ("LTE") network, and/or a fifth generation ("5G") network. PFOS devices 100 may also operate along other fiber optic paths in a core network of the telecommunications system, and/or provide failover for other devices of the telecommunications system.

PFOS devices 100 can be adapted to provide passive fiber optic failover for other fiber optic networks and/or devices that communicate using a fiber optic network regardless of the communication protocol used by the devices. For instance, PFOS devices 100 may operate as part of a passive optical network ("PON"), fiber-to-the-home ("FTTH"), or fiber-to-the-premises ("FTTP") network, and/or other fiber optic network. When providing passive fiber optic failover in a PON, PFOS devices 100 may be connected to one another via redundant paths 330, and may also be connected to OLTs, FDTs, fiber distribution hubs ("FDHs"), and/or other components of the PON. PFOS devices 100 may be integrated or otherwise coupled to other fiber optic devices As shown in FIG. 3A, PFOS device 100-1 may be integrated or otherwise coupled to RRH 310 such that there is no additional fiber between PFOS device 100-1 and RRH 310. Similarly, PFOS device 100-2 may be integrated or otherwise coupled to BBU 320. For instance, PFOS device 100-1 may directly plug into a fiber optic interface of RRH 310, or may be a module that is integrated in RRH 310 and may receive signaling from two or more interfaces of RRH 310 that are connected to paths 330.

First path 330-1 and second path 330-2 may include one or more fibers that are directly or indirectly connected to PFOS devices 100-1 and 100-2. Accordingly, first path 330-1 and second path 330-2 may provide redundant paths for communications between RRH 310, BBU 320, and/or other devices that rely on PFOS devices 100-1 and 100-2 for failing over between paths 330-1 and 330-2. In environment 300, first path 330-1 and fiber path 330-2 each support upstream and downstream communications. In some embodiments, upstream and downstream communications may occur over separate paths.

Figure 3B:
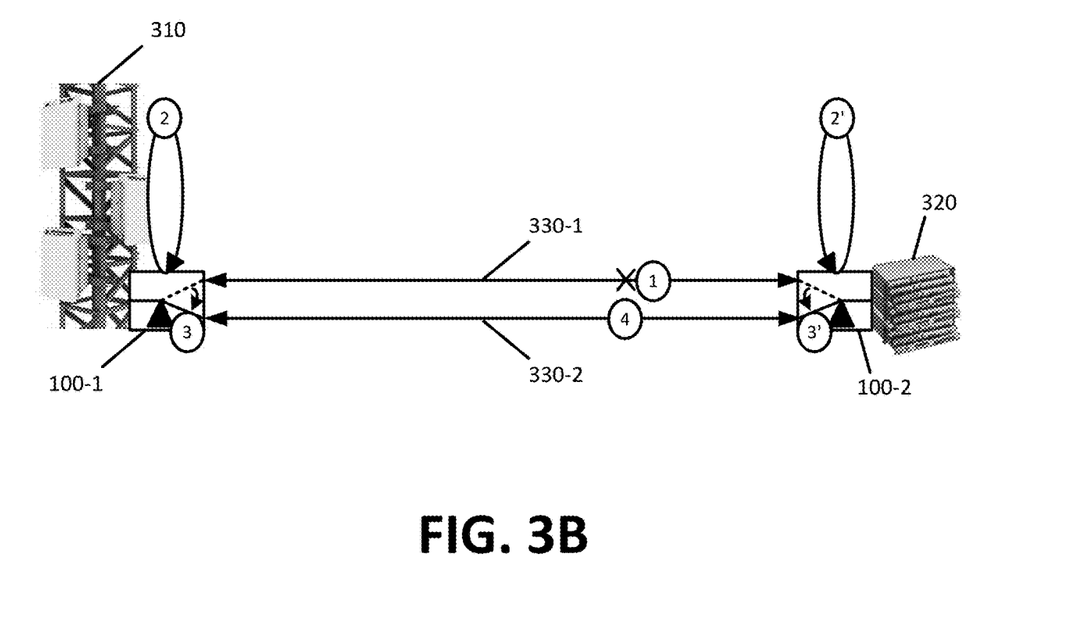
FIG. 3B illustrates an example of PFOS devices failing over communications from a first path to a second path in accordance with some embodiments described herein.

PFOS devices 100-1 and 100-2 may monitor each of paths 330-1 and 330-2 for issues that disrupt signal transmission, and may switch signaling from a failing path to a working path. For instance, PFOS devices 100-1 and 100-2 may monitor voltage, light levels, and/or other properties of the light or signaling to determine when to failover from a first path to a second path. FIG. 3B illustrates an example of PFOS devices 100-1 and 100-2 failing over communications between RRH 310 and BBU 320 from path 330-1 to path 330-2 in accordance with some embodiments described herein.

As shown in FIG. 3B, PFOS devices 100-1 and 100-2 may initially select (at 1) first path 330-1 as a working path over which to transfer signaling between RRH 310 and BBU 320. PFOS devices 100-1 and 100-2 may monitor signal quality on first path 330-1, and may determine (at 2 and/or 2') that the signal quality is outside one or more acceptable thresholds. Each PFOS device 100 may then failover (at 3 and/or 3') from first path 330-1 to second path 330-2 so that signaling between RRH 310 and BBU 320 transfers (at 4) over second path 330-2 instead of first path 330-1. In some embodiments, PFOS devices 100-1 and 100-2 may monitor paths 330-1 and 330-2 frequently (e.g., every 100 milliseconds) so that failover from first path 330-1 to second path 330-2 may occur essentially simultaneously with minimal information loss. In some embodiments, one of PFOS devices 100-1 or 100-2 may first failover from first path 330-1 to second path 330-2. Failover by one PFOS device (e.g., 100-1 or 100-2) to second path 330-2 may cause a complete loss of light on first path 330-1, and the complete loss of light may trigger the other PFOS device to also failover to second path 330-2. In this instance, information loss may be minimized by increasing the monitoring frequency of each PFOS device 330-1 and 330-2. When upstream and downstream signaling are transferred over different paths, PFOS devices 100-1 and 100-2 can operate asynchronously as one of PFOS devices 100-1 or 100-2 may transfer upstream signaling or downstream signaling on both first path 330-1 and second path 330-2, and another of PFOS devices 100-1 or 100-2 may switch to whichever path 330 provides the signal with a quality within the acceptable thresholds.

Figure 4:
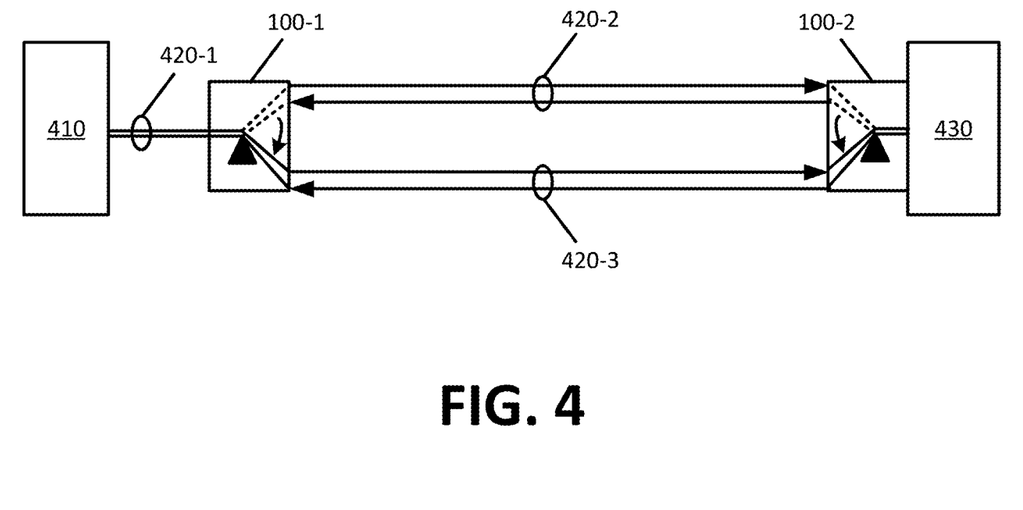
FIG. 4 illustrates another example environment for passive optical switch using PFOS devices in accordance with some embodiments described herein.

Since PFOS devices 100-1 and 100-2 may be passive devices that do not need an active, external, and/or continuous power supply, PFOS devices 100-1 and 100-2 can be located away from the devices (e.g., RRH 310 and BBU 320) that transmit signaling on paths 330, and can be located anywhere along the fiber paths 330. FIG. 4 illustrates another example environment 400 for passive optical switch using PFOS devices 100-1 and 100-2 in accordance with some embodiments described herein.

As shown in FIG. 4, PFOS device 100-1 is connected to first fiber optic device 410 via first pair of upstream and downstream fibers 420-1, and PFOS device 100-1 is also connected to PFOS device 100-2 via second pair of upstream and downstream fibers 410-2 and redundant third pair of upstream and downstream fibers 410-3. PFOS device 100-2 may be integrated as part of or directly attached to second fiber optic device 430.

First fiber optic device 410 may be RRH 310 or another device with a fiber optic interface for communicating over a fiber optic network. Similarly, second fiber optic device 430 may be BBU 320 or another device with a fiber optic interface for communicating with first fiber optic device 410 via the fiber optic network.

In FIG. 4, PFOS devices 100-1 and 100-2 may switch upstream signaling from a first fiber of second pair of fibers 410-2 to a first fiber of third pair of fibers 410-3 independently of switching ownstream signaling from a second fiber of second pair of fibers 410-2 to a second fiber of third pair of fibers 410-3. For instance, in FIG. 4, PFOS devices 100-1 and 100-2 may detect an issue affecting downstream signaling on the second fiber of second pair of fibers 410-2, and may switch the downstream signaling from the second fiber of second pair of fibers 410-2 to a second fiber of third pair of fibers 410-3 while retaining upstream signaling on a first fiber of second pair of fibers 410-2. PFOS devices 100-1 and 100-2 may alternatively switch both upstream and downstream signaling between second pair of fibers 410-2 and third pair of fibers 410-3 in response to an issue that disrupts either upstream or downstream signaling. For instance, PFOS devices 100-1 and 100-2 may detect an issue affecting upstream signaling on the first fiber of second pair of fibers 410-2, and may switch the upstream signaling from the first fiber of second pair of fibers 410-2 and the downstream signaling from the second fiber of second pair of fibers 410-2 to first and second fibers of third pair of fibers 410-3.

Figure 5:
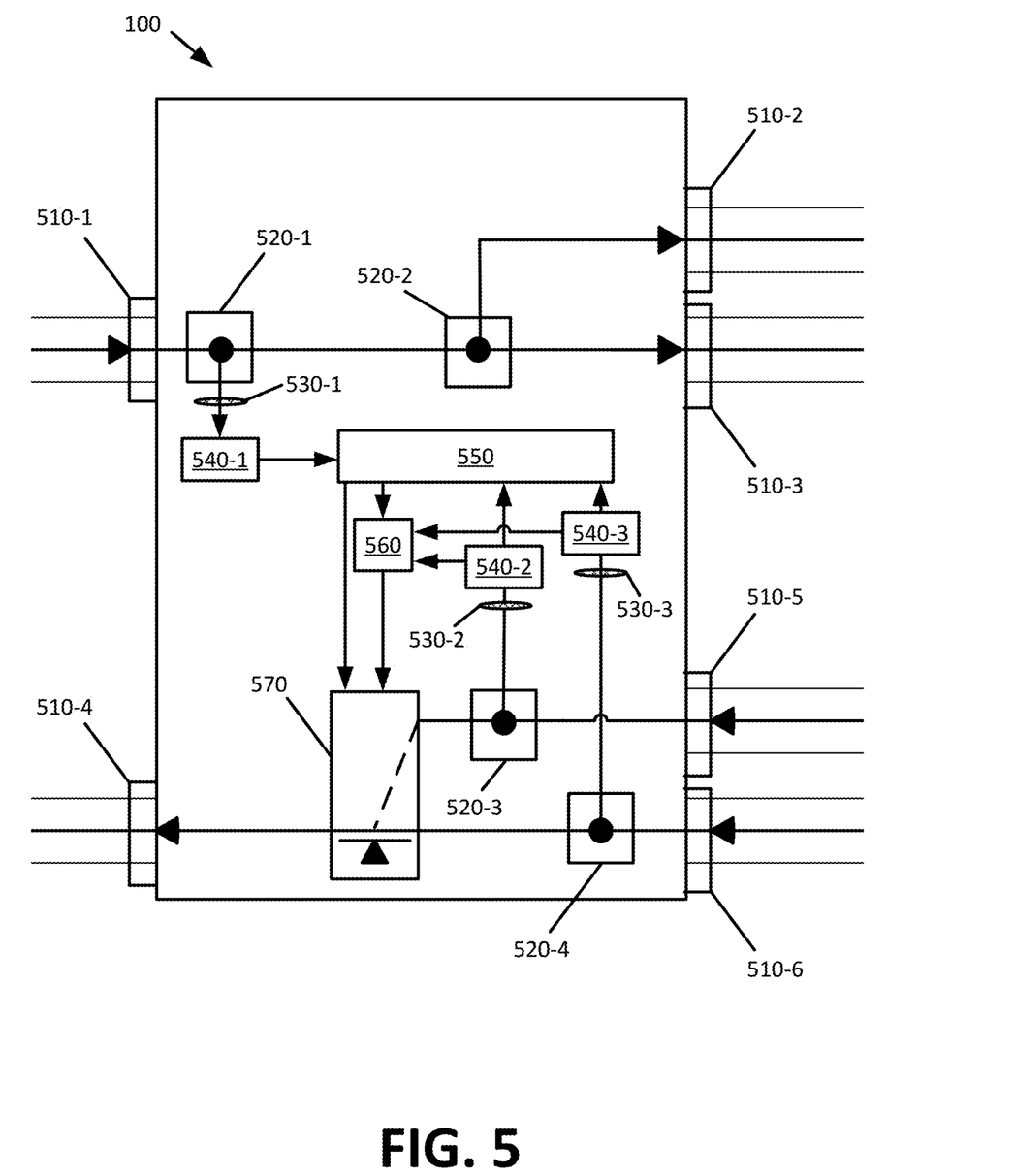
FIG. 5 illustrates example components of the PFOS device in accordance with some embodiments described herein.

FIG. 5 illustrates example components of PFOS device 100 in accordance with some embodiments described herein. The example components illustrated in FIG. 5 may provide for unidirectional switching. In some embodiments, unidirectional switching may include transferring signaling flowing in a first direction (e.g., upstream or downstream) via a particular working path that PFOS device 100 may select from a set of redundant paths based on the positioning of the MEMS mirror switch, and may transfer signaling that flows in an opposite second direction across each path of the set of redundant paths from PFOS device 100.

As shown in FIG. 5, PFOS device 100 may include interfaces 510-1, 510-2, 510-3, 510-4, 510-5, and 510-6 (herein sometimes collectively referred to as "interfaces 510" or individually as "interface 510"), light splitters 520-1, 520-2, 520-3, and 520-4 (herein sometimes collectively referred to as "splitters 520" or individually as "splitter 520"), diffusing lenses 530-1, 530-2, and 530-3 (herein sometimes collectively referred to as "diffusing lenses 530" or individually as "diffusing lens 530"), optical sensors 540-1, 540-2, 540-3 (herein sometimes collectively referred to as "optical sensors 540" or individually as "optical sensor 540"), energy harvester 550, microcontroller 560, and/or optical switch 570. PFOS device 100 may include additional or fewer components. For example, PFOS device 100 may operate without interfaces 510-1, 510-2, and 510-3 when interfaces 510-4, 510-5, and 510-6 support upstream and downstream signaling. As another example, PFOS device 100 may include one or more of optical sensors 540 and/or different types of optical sensors 540 as presented below.

Interfaces 510 may include pass-through optical fiber connection adapters. Each such adapter may pass-through the inbound light flowing from a connected fiber, and/or the outbound light flowing to a connected fiber with minimal or no interference. In some embodiments, interfaces 510-1, 510-2, and 510-3 may pass-through signaling in a first direction (e.g., upstream or downstream), and interfaces 510-4, 510-5, and 510-6 may pass-through signaling in an opposite second direction.

In some embodiments, the pass-through operation of interfaces 510 differs from the optical signal to electrical signal conversion and/or electrical signal to optical signal conversion performed by fiber optic transceivers. Since there is no conversion of the optical signals flowing into and/or out of PFOS device 100, PFOS device 100 may be protocol agnostic, and thereby able to operate on any fiber optic network. More specifically, PFOS device 100 may provide passive fiber optic switching and failover for devices communicating via Synchronous Optical Networking ("SONET"), Gigabit Ethernet, Fiber Channel, and other communications standards, and/or signaling of different wavelengths and frequencies. In some embodiments, interfaces 510 may support different fiber connectors. For instance, fiber with ST, SC, FC, LC, and/or other connectors may be connected to interfaces 510.

Splitters 520 may divert equal or unequal amounts of light about two or more internal paths within PFOS device 100. For instance, splitter 520-1 may divert some amount (e.g., 30%) of light flowing in a first direction (e.g., upstream or downstream) to optical sensor 540-1 with the rest (e.g., 70%) of the light passing to splitter 520-2. Splitter 520-2 may then split (e.g., 50%) the light across the fibers that are connected to interfaces 510-2 and 510-3. In some embodiments splitter 520-1 and 520-2 may be replaced with a single three-way splitter. Splitters 520-3 and 520-4 may divert some amount of the light flowing in from interfaces 510-5 and 510-6 to optical sensors 540-2 and 540-3 respectively, while the rest of the light is passed to optical switch 570.

Light diverted from splitter 520-1 to optical sensor 540-1 may pass through diffusing lens 530-1. Diffusing lens 530-1 may scatter or spread the light over a surface of optical sensor 540-1. In some embodiments, optical sensor 540-1 may include a semiconducting material that converts light into electricity. For instance, optical sensor 540-1 may be a photovoltaic, photodiode, and/or other circuit that can convert light to electricity and/or measure various properties of light.

Diffusing lenses 530-2 and 530-3 may also scatter or spread light diverted by splitters 520-3 and 520-4 across optical sensors 540-2 and 540-3 respectively. In some embodiments, optical sensors 540-2 and 540-3 may have a similar function as optical sensor 540-1, and may convert the diverted light into electricity. In some embodiments, optical sensors 540-2 and 540-3 may be circuits that measure various properties of light. For instance, optical sensors 540-2 and 540-3 may be photodiodes that measure light levels, voltage, frequency, wavelength, and/or other properties of the diverted light.

Energy harvester 550 may collect and/or store the power that is produced by one or more of optical sensors 540. Energy harvester 550 may include a capacitor or battery that stores the collected power.

Microcontroller 560 may include a microprocessor or other circuit that operates using the power stored at energy harvester 550. In some embodiments, microcontroller 560 may periodically measure signal and/or light quality on a path that is switched on by optical switch 570. Microcontroller 560 may obtain and/or the signal and/or light quality from output of one or more of optical sensors 540. Microcontroller 560 may determine, based on the signal and/or light quality, if there are any issues that disrupt the signaling and/or light on the observed path. For instance, microcontroller 560 may obtain the amount of electricity (e.g., voltage and/or current) generated from optical sensors 540, light frequency, light wavelength, and/or other light levels. Microcontroller 560 may determine if these and/or other qualities are within acceptable thresholds. If a particular quality of the signal and/or light falls outside an acceptable threshold, microcontroller 560 may cause optical switch 570 to switch from a current working path to an alternative path.

As one example, microcontroller 560 may be configured with a voltage threshold of 5V. If optical sensor 540-2 produces a voltage of at least 5V for a first period of time, and then produces a lower or no voltage for a second period of time, microcontroller 560 may detect an issue that has disrupted downstream signal flow on the path connected to interface 510-5. Microcontroller 560 may then direct optical switch 570 to switch downstream signaling from the failing path (e.g., path connected to interface 510-5) to a redundant path (e.g., path connected to interface 510-6).

As another example, microcontroller 560 may be configured with a wavelength threshold having a range of 1,596 nanometers ("nm") to 1,602 nm for downstream Next-Generation PON 2 ("NG-PON2") communications. If microcontroller 560 detects, via optical sensor 540-2, wavelengths within the wavelength threshold during a first period of time, and wavelengths outside the wavelength threshold during a second period of time, microcontroller 560 may detect an issue that has disrupted signal flow on the path connected to interface 510-5. Microcontroller 560 may direct optical switch 570 to switch downstream signaling from the failing path (e.g., path connected to interface 510-5) to a redundant path (e.g., path connected to interface 510-6).

In some embodiments, optical switch 570 may be a MEMS mirror switch. The MEMS mirror switch may have an actuated mirror that can switch light from one fiber associated with a first path to a destination to another fiber associated with a second path to the destination. Optical switch 570 may use an electro-static actuator, magnetic actuator, and/or other actuator to reposition a mirror that directs light from one of two or more source paths to a destination path, or from a source path to one of two or more destination paths. Optical switch 570 may receive power for repositioning the mirror and/or switching between paths from energy harvester 550.

Figure 6:
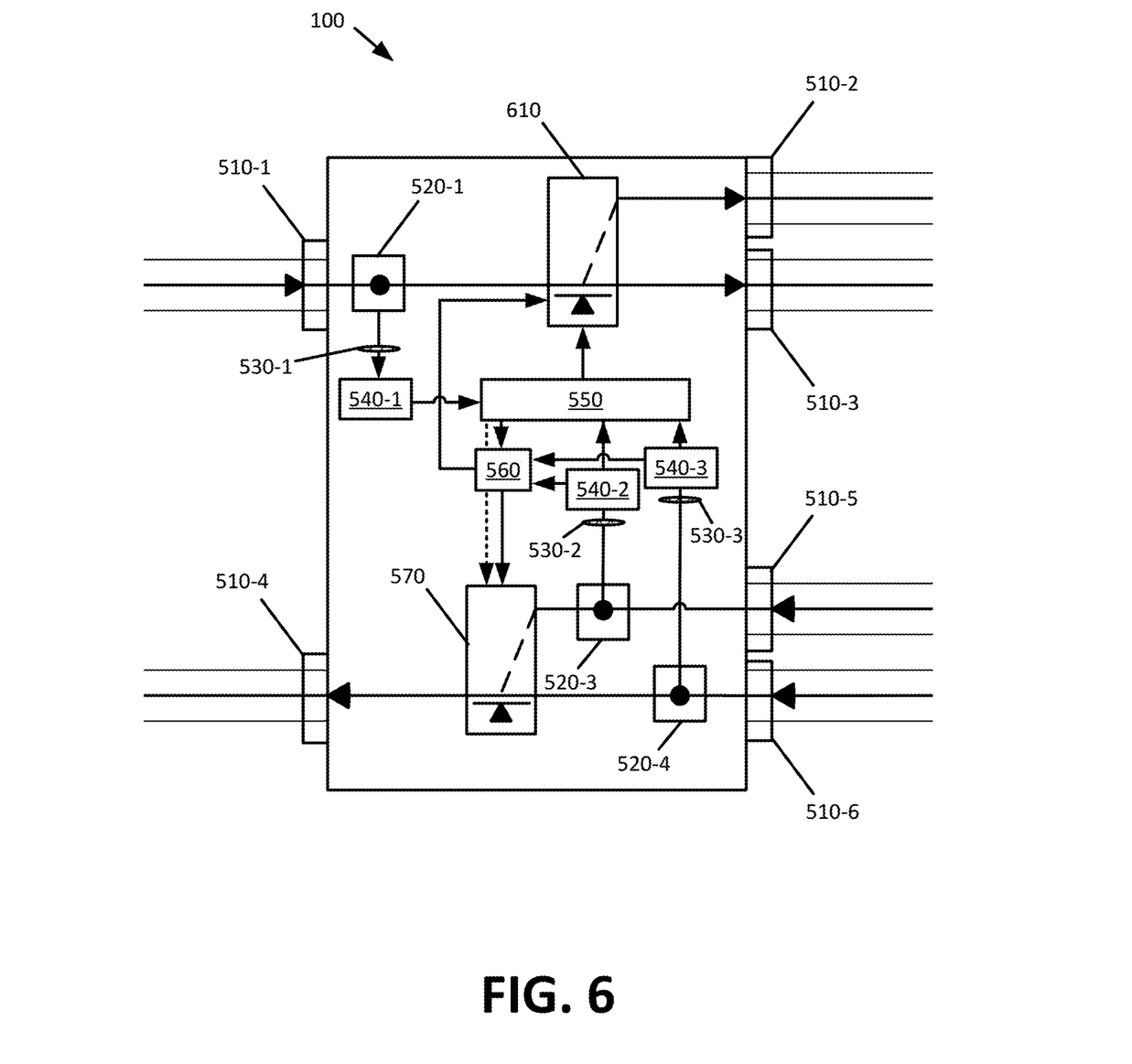
FIG. 6 illustrates example components of a PFOS device providing bidirectional switching in accordance with some embodiments described herein.

FIG. 6 illustrates example components of PFOS device 100 providing bidirectional switching in accordance with some embodiments described herein. As shown in FIG. 6, PFOS device 100 may include a second optical switch 610 (e.g., a second MEMS mirror switch). Optical switch 610 may replace splitter 520-2.

Optical switch 610 may switch upstream signaling to pass through one of at least two redundant upstream paths connected to interfaces 510-2 and 510-3. Optical switch 570 may continue to switch downstream signaling so that downstream signaling may be received from one of at least two redundant downstream paths connected to interfaces 510-5 and 510-6.

In FIG. 6, microcontroller 560 may monitor both upstream and downstream paths in order to detect any issues occurring on any of the paths. Microcontroller 560 may direct a first MEMS mirror switch associated with optical switch 570 to failover and switch to a redundant downstream path after identifying an issue that disrupts signal flow on a current working downstream path. Microcontroller 560 may also direct a second MEMS mirror switch associated with optical switch 610 to failover and switch to a redundant upstream path after identifying an issue that disrupts signal flow on a current working upstream path. Accordingly, microcontroller 560, via the first optical switch, may switch paths for upstream signaling at different times and independently of switching paths for downstream signaling via second optical switch 570.

In some embodiments, PFOS device 100 may switch upstream and/or downstream signaling to alternate paths based on DDM messages and/or other messages. PFOS device 100 may perform the DDM message-based switching in addition to or instead of switching paths based on monitored signal and/or light quality.

The DDM messages may originate from a transceiver of a device that generates the upstream and/or downstream signaling flowing through PFOS device 100. For instance, and with reference to FIG. 3A, PFOS device 100-1 may receive DDM messages from one or more transceivers of RRH 310 when PFOS device 100-1 may be directly connected to the one or more transceivers of RRH 310, or when PFOS device 100-1 may be integrated as part of RRH 310. Similarly, PFOS device 100-2 may receive DDM messages from one or more transceivers of BBU 320 when PFOS device 100-2 may be directly connected to the one or more transceivers of BBU 320, or when PFOS device 100-2 may be integrated as part of BBU 320. In some embodiments, PFOS device 100 may receive DDM messages from a transceiver of a remote device via one or more fibers connecting PFOS device 100 to the remote device.

DDM messages may be defined according to the Multi-Source Agreement ("MSA") SFF-8472 specification. DDM messages may provide information as to real-time parameters of the signal generating and/or receiving transceivers. DDM message and/or other messages may also provide status of the signals that are transmitted from and received by the transceivers. For instance, the DDM messages may identify optical input/output power (e.g., transmit and/or receive average power, received optical modulation amplitude, etc.), temperature, laser bias current, transceiver supply voltage, and/or other parameters of the transceivers.

Microcontroller 560 may identify operating parameters of the transceivers and/or signaling that are outside acceptable thresholds from the DDM messages. For instance, microcontroller 560 may be configured with a maximum supply voltage threshold of 6.55V, maximum receive and transmit power thresholds of 8.2 decibel-milliwatts ("dBm"), and/or a maximum laser bias threshold of 131 milliamps ("mA"). Operating parameters identified via the DDM messages that are outside the acceptable thresholds can be indicative of one or more issues that disrupt signal flow on a path, and/or can be used for early failure prediction. Accordingly, microcontroller 560 may direct one or more of optical switch 570 and optical switch 610 to change paths for upstream and/or downstream signaling in response to receiving DDM messages that specify operating parameters that are outside acceptable thresholds.

Figure 7:
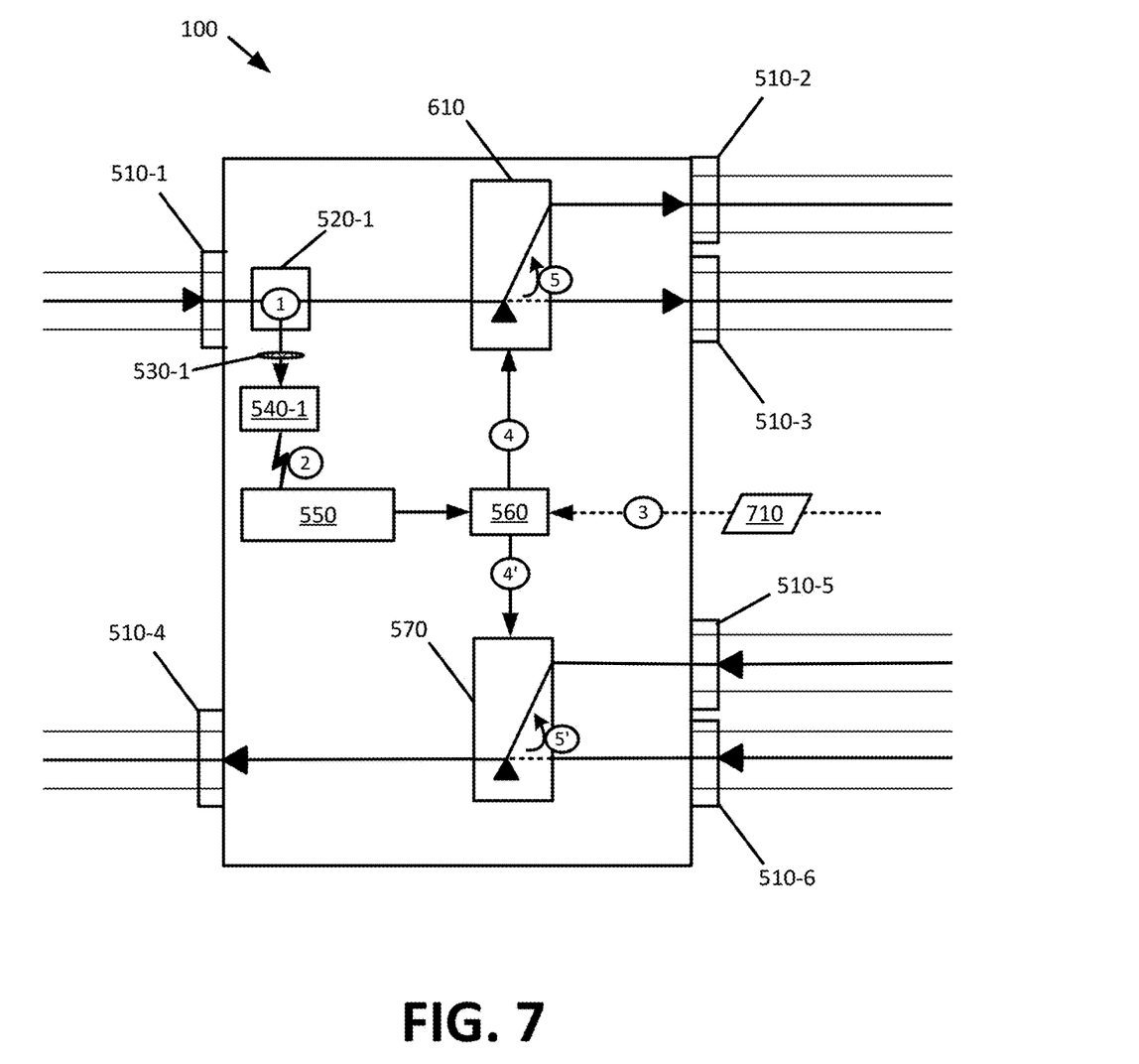
FIG. 7 illustrates an example of a PFOS device that uses Digital Diagnostics Monitoring ("DDM") messages for failover and passive optical switching in accordance with some embodiments described herein.

FIG. 7 illustrates an example of PFOS device 100 that uses DDM messages for failover and passive optical switching in accordance with some embodiments described herein. In FIG. 7, splitter 520-1 may divert (at 1) light flowing upstream and/or downstream to optical sensor 540-1. Diffusing lens 530-1 may spread the diverted light across optical sensor 540-1, and optical sensor 540-1 may convert (at 2) the diverted light into electricity that is then stored at energy harvester 550. Additional energy may be harvested via additional photovoltaics, photodiodes, and/or other optical sensors that receive diverted light from other paths connected to PFOS device 100 (e.g., fiber connected to interface 510-5 and/or 510-6). The stored power may be used to power microcontroller 560.

As shown in FIG. 7, microcontroller 560 may receive (at 3) DDM messages 710 and/or other diagnostic messaging from one or more external devices (e.g., transceivers of RRH 310, BBU 320, OLT, FDH, FDT, and/or other fiber optic devices). In response to receiving DDM messages that identify operating parameters of a device communicating via a first path, and that are outside acceptable thresholds, microcontroller 560 may direct (at 4 and/or 4') optical switch 570 and/or optical switch 610 to change (at 5 and/or 5') signaling from the first path to a redundant second path.

As a result of changing (at 5 and/or 5') signaling from the first path to the second path, the first path may become dark. A PFOS device at an opposite end of the first path may detect the change, and may also switch to the second path so that the signaling path fails over from the first path to the second path for device communicating at either end of the redundant paths.

In some embodiments, the transceivers and/or external device communicating via the transceivers may monitor the DDM messages for operating parameters that exceed one or more thresholds. In response to an operating parameter that is outside an acceptable threshold, the transceiver or external device may generate an alert that provides a signal to one or more of microcontroller 560, optical switch 570, and/or optical switch 610. In some embodiments, the signal may be a logic high (e.g., 5V) or logic low (e.g., 0V). The provided signal may cause optical switch 570 and/or optical switch 610 to switch signaling from a current working path to an alternate path. In some such embodiments, the logic for determining when to failover from a working path to alternate path is performed by a device other than PFOS device 100.

Figure 8:
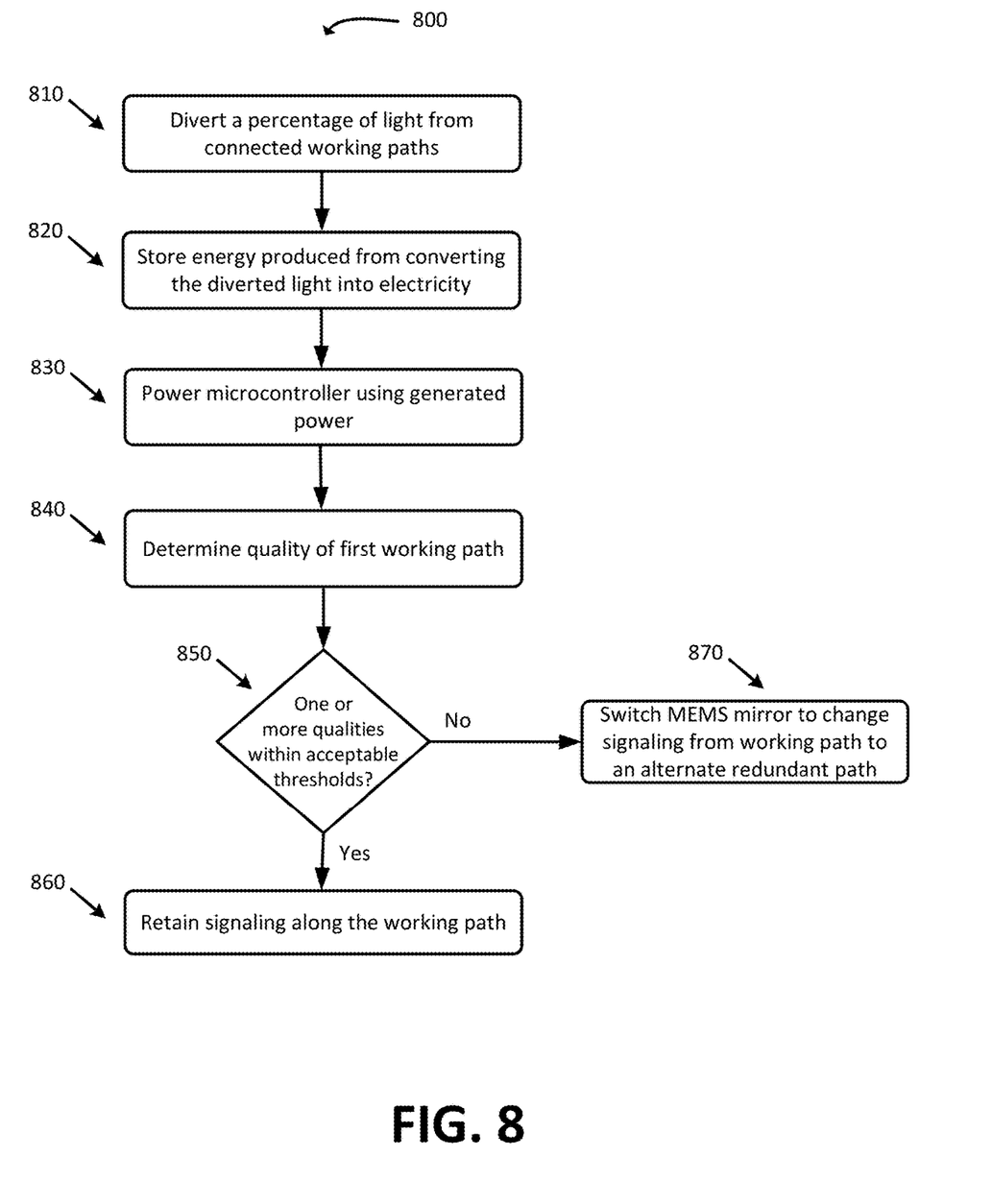
FIG. 8 presents a process for passive optical switch using the PFOS device in accordance with some embodiments described herein.

FIG. 8 presents process 800 for passive optical switch using PFOS device 100 in accordance with some embodiments described herein. In particular, process 800 may be performed when PFOS device 100 is connected to a fiber optic network with two or more paths to a destination.

Process 800 may include diverting (at 810) a percentage of light from one or more working paths connected to PFOS device 100. As noted above, different splitters may be used to divert different percentages of light. PFOS device 100 may divert different amounts of light in order to generate a sufficient amount of power to operate PFOS device 100 from the diverted light in environments where PFOS device 100 light quality differs and/or PFOS device 100 perform fewer or additional operations.

Process 800 may include storing (at 820) energy that is produced from converting the diverted light into electricity using one or more optical sensors 540. The resulting energy may be stored in a capacitor or battery of PFOS device 100, and may power (at 830) operation of microcontroller 560.

Process 800 may include determining (at 840), based on operation of microcontroller 560, quality of the working path. For instance, microcontroller 560 may determine (at 840) quality of the working path by monitoring light levels, voltage, frequency, wavelength, and/or other properties of the signaling and/or light on the working path. Additionally, or alternatively, Microcontroller 560 may determine (at 840) quality of the working path based on DDM messages and/or other messages that PFOS device 100 receives, and that specify operating parameters of fiber optic transceivers transmitting and/or receiving signaling on the working path.

Process 800 may include determining (at 850) whether one or more qualities of the working path are within acceptable thresholds. For instance, a quality of the working path may be outside an acceptable threshold when the voltage measured from the working path (e.g., 4V) is lower than a threshold voltage (e.g., 5V). In some embodiments, two or more different qualities of the working path may be monitored and/or measured in order to produce a normalized score. For instance, the normalized score may be based on two or more of the voltage, light level, frequency, and wavelength measured on the working path. The normalized score may represent the overall quality of the working path to account for deviations that may periodically occur to one or more qualities. The normalized score may be compared to one or more thresholds in order to determine whether to initiate failover from a working fiber to an alternate fiber. For instance, a working fiber may experience a ten millisecond drop in voltage below a configured threshold voltage. The temporary voltage drop may not necessarily necessitate failover to an alternate fiber when other qualities of the working fiber remain within acceptable thresholds.

In response to determining (at 850—Yes) that the one or more qualities of the working path fall within the acceptable thresholds, process 800 may include retaining (at 860) signaling along the working path. In other words, PFOS device 100 does not modify the signaling path, and/or switch signaling from the working path to an alternate redundant path to the same destination.

In response to determining (at 850—No) that the one or more qualities of the working path are outside of the acceptable thresholds, process 800 may including switching (at 870) the light and/or signaling from the working path to an alternate redundant path that directly or indirectly connects to the same destination as the working path. To switch the light and/or signaling, microcontroller 560 may provide one or more commands and/or messaging to a first MEMS mirror switch (e.g., optical switch 570) and/or a second MEMS mirror switch (e.g., optical switch 610). The first MEMS mirror switch and/or the second MEMS mirror switch may reposition a mirror to divert the light and/or signaling from the working path to the alternate redundant path in response to receiving the commands and/or messaging from microcontroller 560.

PFOS device 100 may be adapted for other applications in addition to or instead of switching signaling from a failing path to a redundant path. For instance, PFOS device 100 may use the electricity that is generated from the diverted light flowing across a connected fiber optic network to power a sensor, an Internet-of-Things ("IoT") device, and/or other low-power electronic device.

In some embodiments, PFOS device 100 may provide power to one or more sensors or IoT devices (e.g., a seismic sensor, an image sensor, an environmental sensor) and/or a wireless radio that are integrated, coupled, or otherwise attached to PFOS device 100. The one or more sensors or IoT devices may generate one or more alerts regarding any sensed activity along a fiber path. The one or more alerts may power on the wireless radio, and the wireless radio may draw power from energy harvester 550 in order to transmit the one or more alerts to a remote device.

For example, PFOS device 100 may be integrated with and provide power to a seismic sensor. The seismic sensor may detect vibrations and/or other activity that could potentially impact transmission of signaling along a fiber path. The detected activity can be wirelessly transmitted, via the wireless radio, to a network operations center. The network operations center may then monitor the fiber path to take any actions to preserve the quality of service. The actions may include routing signaling through alternate networks or paths.

As another example, PFOS device 100 may be integrated with and provide power to a temperature, atmospheric, pressure, and/or other environmental sensor or any other IoT device. The sensor(s) can obtain measurements (e.g., temperature, pressure, and/or other values) that can be used to diagnose conditions that may affect the fiber optic network. The measurements may be wirelessly transmitted, via the wireless radio, to a network operations center, or to transmitting devices on the fiber optic network. In response, the network operations center or transmitting devices may alter signaling parameters to improve network performance in light of the detected measurements.

As another example, PFOS device 100 may monitor the signaling and/or data passing through the fiber optic network. For instance, PFOS device 100 may detect overall usage (e.g., bandwidth usage), amount of data being transferred, latency, etc. By monitoring the signaling and/or data, PFOS device 100 may provide additional information for diagnosing issues affecting the network. For instance, signaling and/or data monitored PFOS device 100 may be compared against signaling and/or data monitored at a sending and/or receiving device in order to determine if an issue originates at the sending and/or receiving device, along the fiber path, and/or elsewhere in the fiber optic network.

Figure 9:
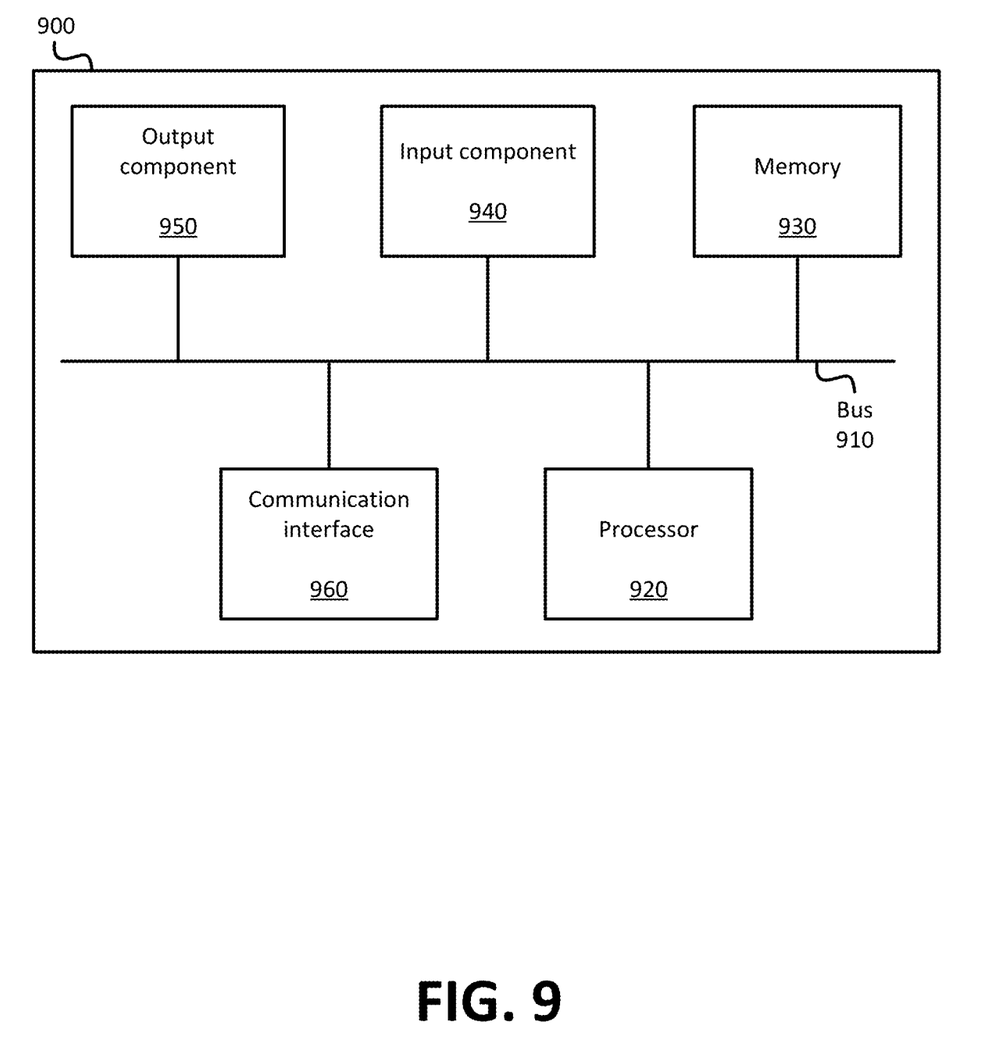
FIG. 9 illustrates example components of one or more devices, according to one or more embodiments described herein.

FIG. 9 is a diagram of example components of device 900. Device 900 may be used to implement certain of the devices or systems described above (e.g., PFOS device 100). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIG. 8, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
    an optical switch;
    a first pass-through fiber optic interface connected to the optical switch via a first path;
    a second pass-through fiber optic interface connected to the optical switch via a second path;
    a third pass-through fiber optic interface transferring light into the device;
    an in-line diffusing lens, wherein the in-line diffusing lens scatters a portion of the light received via the first path;
    an in-line optical sensor for producing power from the scattered portion of the light, wherein the optical switch is powered by at least some of the power produced by the in-line optical sensor;
    a non-transitory computer-readable medium storing a set of processor-executable instructions; and
    one or more processors configured to execute the set of processor-executable instructions, wherein executing the set of processor-executable instructions causes the one or more processors to:
        direct the optical switch to select the first path for transmission of the light received via the third pass-through fiber optic interface;
        monitor one or more measures of quality associated with the first path, wherein the monitoring is based on the scattered portion of the light;
        detect, based on the monitoring, that the one or more measures of quality do not satisfy one or more threshold measures of quality; and
        direct, based on the detecting that the one or more measures of quality do not satisfy the one or more threshold measures of quality, the optical switch to select the second path.

2. The device of claim 1 further comprising:
    a light splitter located in the first path, the light splitter diverting the portion of light from the first path to the diffusing lens while a different portion of the light continues along the first path.

3. The device of claim 1 further comprising:
    a power storage circuit that stores the power generated by the optical sensor which provides the power to the one or more processors.

4. The device of claim 1, wherein the optical switch is a Micro-Electro-Mechanical System ("MEMS") mirror switch.

5. The device of claim 1, wherein the optical sensor is one of a photovoltaic or photodiode.

6. The device of claim 1, wherein the one or more measures of quality comprise optical modulation amplitude.

7. The device of claim 1 further comprising:
    a photodiode; and
    a light splitter located in the first path, the light splitter diverting a portion of the light from the first path to the photodiodeg,
    wherein the processor-executable instructions further include processor-executable instructions to receive the one or more measures of the quality from the photodiode.

8. The device of claim 1, wherein the processor-executable instructions to monitor the one or more measures of quality include processor-executable instructions to determine a voltage of the power produced by the optical sensor; and
    wherein the processor-executable instructions to detect that the one or more measures of quality do not satisfy the one or more threshold measures of quality include processor-executable instructions to detect that the voltage is less than a voltage threshold.

9. The device of claim 1, wherein the processor-executable instructions further include processor-executable instructions to:

receive at least one Digital Diagnostics Monitoring ("DDM") message from a second device that is connected to at least one of the first pass-through fiber optic interface and the second pass-through fiber optic interface;

detect, based on the DDM message, an operating parameter of the second device that does not satisfy a threshold measure of the operating parameter; and direct, based on the detecting that the operating parameter does not satisfy the threshold measure of the operating parameter, the optical switch to select the second path.

10. The device of claim 1 further comprising:

a fourth pass-through fiber optic interface;

a fifth pass-through fiber optic interface;

a second optical switch that uses the power generated by the optical sensor to switch light associated with downstream signaling between a fourth path to the fourth pass-through fiber optic interface and a fifth path to the fifth pass-through fiber optic interface;

wherein the first and second pass-through fiber optic interfaces transfer light associated with upstream signaling to a destination; and wherein the fourth and fifth pass-through fiber optic interfaces transfer the light associated with the downstream signaling from the destination.

11. The device of claim 10, wherein the processor-executable instructions further include processor-executable instructions to:

direct the second optical switch to select the fourth path for transmission of the light associated with the downstream signaling;

monitor one or more measures of quality associated with the fourth path;

detect, based on the monitoring of the one or more measures of quality associated with the fourth path, that the one or more measures of quality associated with the fourth path do not satisfy one or more threshold measures of quality; and direct, based on the detecting that the one or more measures of quality associated with the fourth path do not satisfy the one or more threshold measures of quality, the second optical switch to select the fifth path.

12. The device of claim 10, wherein the processor-executable instructions to direct the optical switch to select the second path shifts the light, received via the third pass-through fiber optic interface, from being propagated via the first path to being propagated via the second path.

13. A non-transitory computer-readable medium, storing a set of processor-executable instructions, which, when executed by one or more processors, cause the one or more processors to:

selectively cause an optical switch to transmit, via either a first path or a second path, light received by the optical switch via a third path, the causing including selecting the first path for transmission of light from a first pass-through fiber optic interface associated with the first path, wherein the optical switch is powered by power that is generated from a scattered portion of the light received via the first path, wherein the scattered portion of the light is passed through an in-line diffusing lens;

monitor one or more measures of quality associated with the first path;

detect, based on the monitoring, that the one or more measures of quality do not satisfy one or more threshold measures of quality; and direct, based on the detecting that the one or more measures of quality do not satisfy the one or more threshold measures of quality, the optical switch to transmit light, received via the third path, via the second path between the optical switch and a second pass-through fiber optic interface associated with the second path, wherein the switch uses the power that is generated from the scattered portion of the light received via the first path.

14. The non-transitory computer-readable medium of claim 13, wherein the processor-executable instructions further include processor-executable instructions to:

receive the one or more measures of the quality from an optical sensor that receives the scattered portion of the light from the first path.

15. The non-transitory computer-readable medium of claim 13, wherein the processor-executable instructions further include processor-executable instructions to:

receive at least one Digital Diagnostics Monitoring ("DDM") message from a device that is connected to at least one of the first pass-through fiber optic interface and the second pass-through fiber optic interface;

detect, based on the DDM message, an operating parameter of the device that does not satisfy a threshold measure of the operating parameter; and direct, based on the detecting that the operating parameter does not satisfy the threshold measure of the operating parameter, the optical switch to select the second path.

16. A method comprising:

selecting, via an optical switch, a first path for transmission of light through a first pass-through fiber optic interface of a device, the light having been received by the optical switch via a third path;

scattering, via a diffusing lens, a portion of the light that is received from the optical switch via the first path;

producing, at an optical sensor of the device, power from the portion of the light that is scattered via the diffusing lens, wherein the power produced at the optical sensor powers the optical switch;

monitoring one or more measures of quality associated with the transmission of light at the first path;

detecting, based on the monitoring, that the one or more measures of quality do not satisfy one or more threshold measures of quality; and switching, via the optical switch and using the power that is produced by the optical sensor, transmission of the light, received via the third path, from the first path to a second path between the optical switch and a second pass-through fiber optic interface of the device.

17. The method of claim 16, wherein the switching comprises:

changing an actuated mirror of the optical switch from a first position that transfers the light through the first path to a second position that transfers the light through the second path.

18. The method of claim 16, wherein the one or more measures of quality comprise one or more of a voltage, light level, frequency, optical modulation amplitude, or wavelength.

19. The method of claim 16, further comprising:

receiving at least one Digital Diagnostics Monitoring ("DDM") message from a second device that is connected to at least one of the first pass-through fiber optic interface and the second pass-through fiber optic interface;

detecting, based on the DDM message, an operating parameter of the second device that does not satisfy a threshold measure of the operating parameter; and directing, based on the detecting that the operating parameter does not satisfy the threshold measure of the operating parameter, the optical switch to select the second path.

20. The method of claim 16, wherein the optical switch is a Micro-Electro-Mechanical System ("MEMS") mirror switch.

* * * * *